United States Patent
Ricks et al.

[11] Patent Number: 5,391,013
[45] Date of Patent: Feb. 21, 1995

[54] TRIPOD JOINT

[75] Inventors: Michael Ricks, Bad Vilbel; Norbert Hofmann, Rodgau; Friedholm John, Hanau-Steinheim; Werner Krude, Neunkirchen-Wolperath; Dieter Jost, Troisdorf; Peter Harz; Jörg Bensinger, both of Hennef, all of Germany

[73] Assignees: Lohr & Bromkamp GmbH, Offenbach am Main; GKN Automotive AG, Sieburg, both of Germany

[21] Appl. No.: 943,331

[22] Filed: Sep. 10, 1992

[30] Foreign Application Priority Data

Sep. 11, 1991 [DE] Germany ............... 4130183

[51] Int. Cl.$^6$ ............................................. F16D 3/00
[52] U.S. Cl. ................................... 403/59; 464/111
[58] Field of Search ............... 464/111, 120, 139, 162, 464/167, 905, 906; 403/59; 384/49

[56] References Cited

U.S. PATENT DOCUMENTS

| 4,571,214 | 2/1986 | Orain | 464/111 |
| 4,741,723 | 5/1988 | Orain . | |
| 4,773,890 | 9/1988 | Iwasaki | 464/111 |
| 5,167,583 | 12/1992 | Bensinger | 464/111 |
| 5,171,185 | 12/1992 | Schneider | 464/111 |
| 5,203,741 | 4/1993 | Turner | 464/111 |
| 5,209,700 | 5/1993 | Bensinger | 464/111 |

FOREIGN PATENT DOCUMENTS

| 426186 | 5/1991 | European Pat. Off. | 464/111 |
| 1268690 | 6/1961 | France | 464/111 |
| 2831044 | 10/1979 | Germany . | |
| 3716962 | 4/1988 | Germany . | |
| 116126 | 6/1986 | Japan | 464/111 |
| 233522 | 10/1987 | Japan | 464/111 |
| 2070195 | 9/1981 | United Kingdom . | |
| 2188701 | 10/1987 | United Kingdom . | |

Primary Examiner—Randolph A. Reese
Assistant Examiner—Anthony Knight
Attorney, Agent, or Firm—Harness, Dickey & Pierce

[57] ABSTRACT

A tripod joint has an outer joint part with three circumferentially distributed, axis-parallel recesses forming circumferentially distributed opposed tracks. An inner joint part has a star-shaped cross-section and three circumferentially distributed arms engaging the recesses in the outer joint part. The arms support roller assemblies. When torque is transmitted with the joint in an extended position, the resultant $K_1$ of the forces acting from the inner joint part directly on a roller forms a shorter perpendicular distance from the joint axis than the resultant $K_2$ of the counter forces acting from the outer joint part on the roller, so that, when torque is introduced into the joint, at any angle of articulation of the operating range, the roller is subject to a tilting moment.

20 Claims, 8 Drawing Sheets

TRIPOD JOINT

BACKGROUND OF THE INVENTION

The invention relates to a tripod joint having an outer joint part with three circumferentially distributed, axis-parallel recesses which form circumferentially distributed opposed tracks. An inner joint part having a star-shaped cross-section and three circumferentially distributed arms engaging the recesses in the outer joint part. The arms support roller assemblies. Each roller assembly includes a roller carrying assembly and a roller. The roller, with respect to the arm, is axially movable relative to the arm axis and angularly movably pivotable relative to the arm axis.

Tripod joints which provide movability are described, for example, in DE 28 31 044 (Honda), DE 39 36 601 (GKN) and DE 37 16 962 (NTN).

When the joint rotates in an articulated condition with reference to the inner joint part, there occurs radially oscillating movement of the rollers relative to the axis of the inner joint part and pivoting movement of the rollers on the arms. At the same time, during the articulated condition with reference to the outer joint part, there occurs longitudinally extending oscillating rolling movement of the rollers along the tracks. The first mentioned radial and pivot movements are accompanied by sliding friction whereas the next mentioned movements are predominantly rolling contact movements. Because of said friction forces, prior art tripod joints with an increasing angle of articulation, are subject to a considerable increase in joint excitation forces, e.g. cyclic forces generated in the joint and transmitted to the driveline. Because of the wear caused in the driveline and the development of noise, such forces are highly undesirable.

In addition, in some cases such joint excitation forces scatter from joint to joint, sometimes even within the individual joint during operation. The cause of the scatter may be an unstable behavior of the roller in the tracks of a joint rotating in the articulated condition. This may lead to different and changing contact and friction conditions on various contact faces of the roller assembly relative to the recesses.

SUMMARY OF THE INVENTION

In view of the above, it is an object of the invention to develop a joint that improves the friction conditions in the joint and, in consequence, reduces and predetermines the joint excitation forces.

A first solution provides spherical faces at the arms or at elements of the respective roller assembly. Internally spherical or internally cylindrical counter faces at elements of the roller assembly or at the rollers, on the one hand, and the outer surfaces of the rollers and the track surfaces in contact therewith, on the other hand, are designed such that when torque is transmitted, with the joint in an extended position, the resultant of the forces acting from the inner joint part directly on a roller between the first mentioned faces features a shorter perpendicular distance from the joint axis than the resultant of the counter forces acting from the outer joint part on the roller between the next mentioned faces. Thus, when torque is introduced into the joint, at any angle of articulation in the operating range, the roller is subject to a tilting moment which tilts the roller inwardly towards the joint axis around its contact face at the loaded track.

In principle, this means that the force application point for the forces applied by the respective tripod arm is asymmetrically located directly to the inner surface of the roller. Thus, the roller is radially inwardly offset relative to the force application point of the forces applied by the surface of the respective track to the outer surface of the roller to generate the tilting moment. It is appreciated that roller assembly elements are provided between the arm and roller. The roller assembly elements transmit the forces directly from the arm to the inner surface of the roller. The term "force application point" refers to the intersection point between the force application line of the resulting force and the respective inner or outer roller surface. In view of the fact that the joint in accordance with the invention may already be articulated in the installed condition, the radial perpendicular distance between the two force application lines, with reference to the axis of the outer joint part, is such that the direction of rotation of the tilting moment acting on the roller remains positive in the same direction under all operating angles of articulation.

The advantageous effects of the above measures are that when torque is introduced into the joint, stable contact conditions of the roller assemblies, relative to the recesses in the outer joint part, are ensured independently of the speed and angle of articulation. Thus under all operating conditions, there exist foreseeable contact conditions which, in turn, provide defined friction conditions which determine the joint excitation forces. In consequence, these friction conditions may be positively influenced by advantageously determining the position and design of the respective sliding surfaces. Such positive influences may be exerted by suitably designing the roller assemblies and recesses, especially the radially outer and inner supporting faces, and by determining the radial play between the roller assembly and the supporting faces.

The supporting faces may be provided at the outer joint part on the radial outside or radial inside relative to the roller assembly. In each case, with reference to the joint axis and with reference to the resulting friction forces, it is advantageous if the contact between the parts of the roller assembly, especially of a roller carrier, and the supporting faces takes place on a friction diameter, with reference to the arm axis, which is greater than the radial distance "a" (in accordance with the invention) with reference to the joint axis, between the resultants of the forces at the roller.

The support faces, which counteract further tilting of the roller assembly, may also be provided directly by deviating cross-sectional shapes of the tracks and rollers. For example, the rollers outer surface, in section, has the shape of a circular arch whereas the track, in section, has the shape of a gothic arch.

As far as details are concerned, supporting faces are provided in the recess and on one of the elements of the roller assembly. The roller assembly displaced by the tilting moment is supported on faces, the half of the recess subject to loads when torque is introduces, of which, with reference to the joint axis, are located on the radial outside of the roller assembly. On the half of the recess which is not subjected to loads when torque is introduced, the roller assembly is supported on faces which, with reference to the joint axis, are located on the radial inside of the roller assembly.

Furthermore, it is proposed that when the roller assembly is not displaced, a free radial space is provided between the elements of the roller assembly and the recess supporting faces. Alternatively, the supporting faces and counter faces may be formed by the tracks in the recesses. In the cross-section through the joint, the tracks deviate from the cross-sectional shape of the outer surfaces of the rollers.

A second solution provides spherical faces at the arms or at elements of the respective roller assembly. Internally spherical or internally cylindrical counter faces at elements of the roller assembly or at the rollers, on the one hand, and the surfaces of the rollers and the track surfaces in contact therewith, on the other hand, are designed such that when torque is transmitted, with the joint in an extended position, the resultant of the forces acting from the inner joint part directly on a roller between the first mentioned faces features a greater perpendicular distance from the joint axis than the resultant of the counter forces acting from the outer joint part on the roller between the next mentioned faces. Thus, at any angle of articulation in the operating range, the roller is subject to a tilting moment which tilts the roller outwardly around its region of contact at the loaded track.

In principle, this means that the force application point for the forces applied by the respective tripod arm is symmetrically located directly on the inner surface of the roller. Thus, the roller is radially outwardly offset relative to the force application point of the forces applied by the surface of the respective track to the outer surface of the roller to generate the tilting moment. It is appreciated that roller assembly elements are provided between the armand roller. The roller assembly elements transmit the forces directly from the arm to the inner surface of the roller. The term "force application point" refers to the intersection point between the force application line of the resulting force and the respective inner or outer roller surface. In view of the fact that the joint in accordance with the invention may already be articulated in the installed condition, the radial perpendicular distance between the two force application lines, with reference to the axis of the outer joint part, is such that the direction of rotation of the tilting moment acting on the roller remains positive in the same direction under all operating angles of articulation. This means that in designing the joint, the sum of the articulation angle as installed and the operational angle of articulation are taken into account.

The advantageous effect of the above measures is that, in the case of any torque deviating from zero, stable contact conditions of the roller assemblies relative to the recesses in the outer joint part are ensured independently of the speed and angle of articulation. Thus, under all operating conditions, there exist foreseeable contact conditions and thus defined friction conditions which determine the joint excitation forces. In consequence,, these friction conditions may be positively influenced by advantageously determining the position and design of the respective sliding surfaces. Such positive influences may be exerted by suitably designing the roller assemblies and recesses, especially the radial supporting faces, and by determining the radial play between the roller assembly and the recesses.

According to an advantageous embodiment, one of the elements of the roller assembly is provided with a supporting face. The supporting forces acting on faces on the recess half on the radial outside of the roller assembly, which is not subjected to loads when torque is introduced, generates a counter moment accommodating the tilting moment acting on the roller. Such a supporting face, e.g. head face, may advantageously be provided on a smaller diameter than a supporting face which is positioned on the radial inside of the roller assembly on the recess half which is subjected to loads during the transmission of torque. This face may also be referred to as a shoulder face. Any contact should be avoided by selecting a suitable radial play and by locating the resulting forces at the rollers as determined in accordance with the invention.

A further supporting face is provided in the recess relative to one of the elements of the roller assembly. Also, through further supporting faces, they contribute to the counter moment accommodating the tilting moment acting on the roller. These support faces may be provided on the radial inside of the roller carrier assembly on the recess half which is subjected to loads when torque is introduced.

From the following detailed description taken in conjunction with the accompanying drawings and subjoined claims, other objects and advantages of the present invention will become apparent to those skilled in the art.

BRIEF DESCRIPTION OF THE DRAWINGS

The invention may be applied to the various above mentioned joint designs which will be explained in greater detail with reference to the drawings.

DETAILED DESCRIPTION OF THE PREFERRED EMBODIMENTS

Figures 1, 2, 3:
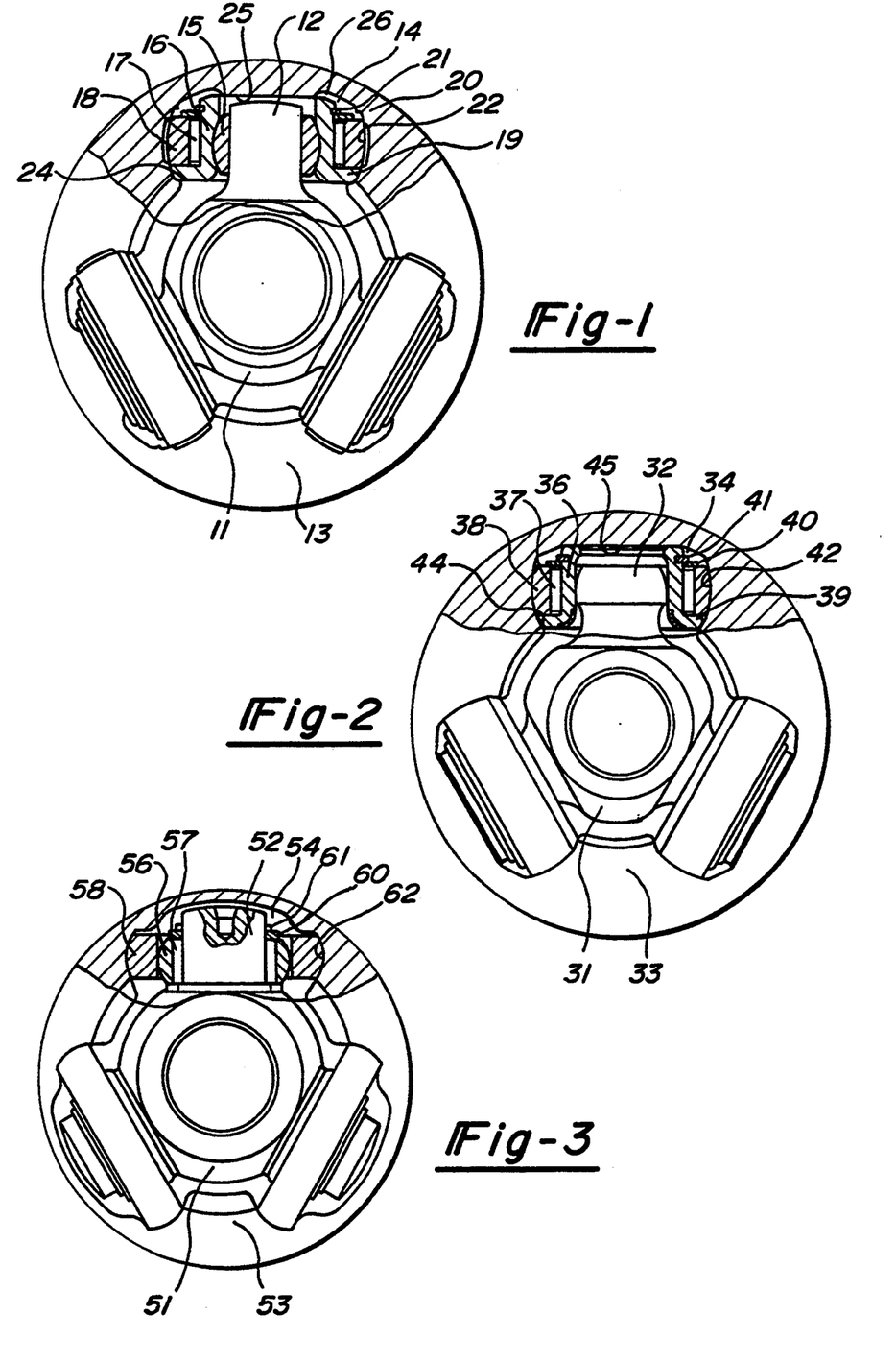
FIG. 1 is an axial view, partially in section, of a joint in accordance with the present invention.
FIG. 2 is an axial view, partially in section, of another joint in accordance with the present invention.
FIG. 3 is an axial view, partially in section, of another joint in accordance with the present invention.
Figures 4, 5:
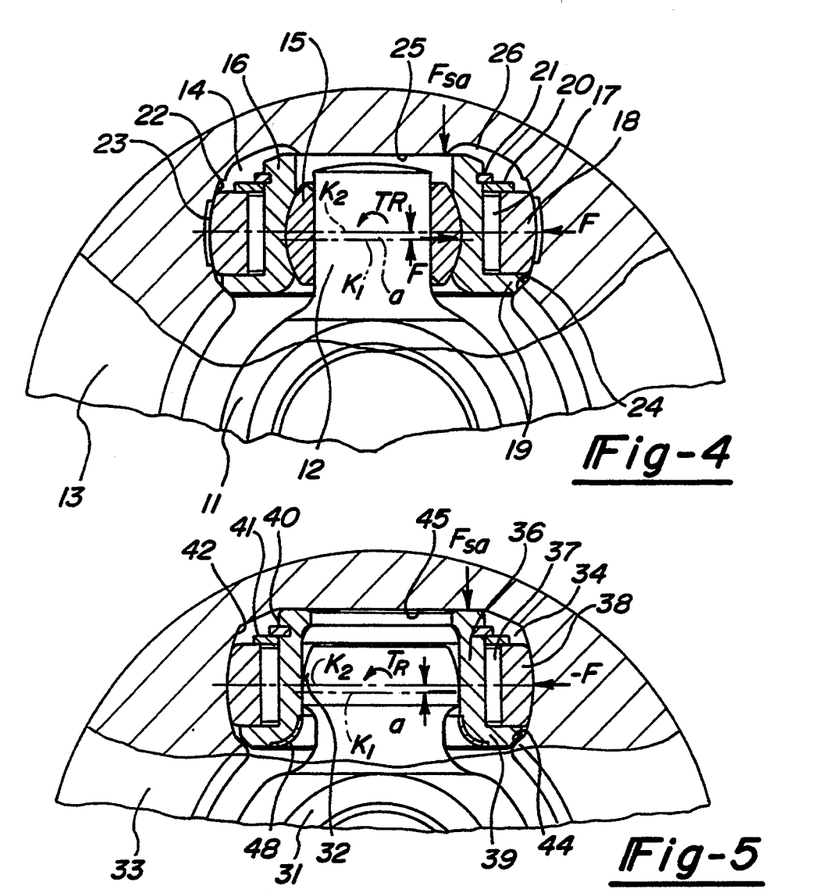
FIG. 4 is an enlarged detail view of FIG. 1.
FIG. 5 is an enlarged detail view of FIG. 2.

FIGS. 1 and 4 each show a substantially annular inner joint part 11 with circumferentially distributed radial cylindrical arms 12. An outer joint part 13 has circumferentially distributed recesses 14, with the arms engaging the recesses. Roller assemblies are provided on each arm.

The roller assemblies each include an inner roller 15 with an internally cylindrical inner surface and an externally spherical outer surface. With reference to the joint axis, the inner roller 15 is able to oscillate radially on the arm 12. A roller carrier 16 is held on the inner roller 15. The carrier 16 has an internally spherical recess and is pivotably positioned on the externally spherical outer surface of the inner roller 15. A roller 18 is rotatably held on the roller carrier 16 via a needle bearing 17. The needle bearing and the rollers, with reference to the joint axis, are held by a radially inner collar 19, a radially outer disc 20 and a retaining ring 21.

During the introduction of torque, the externally spherical roller 18 rolls on one of the racks 22 in the recess 14. Each track 22 is provided with a groove 23 for lubricant. On the radial inside of the roller assembly, the two halves of the recess 14 are each provided with shoulders 24. The shoulder 24 positioned on the recess half subjected to loads during the introduction of torque is to be kept contact-free. On the other hand, the roller carrier 19, on the half of the recess 14, subjected to loads during the introduction of torque, is supported on a supporting face 25 on the radial outside of the roller assembly. The supporting face 25 is restricted by radial extensions 26 on each half of the recess 14 to a region close to the arm axis.

Dash-dot lines describe the force application line $K_1$ of a resulting force acting from the arm on the inner roller 15 and thus indirectly on the roller 18 (on the radial inside). The force application line $K_2$ is a resulting force acting from the tracks 22 directly on the roller 18 (on the radial outside). The lines maintain a positive radial distance "a" between one another under all operating angles of articulation. As a result, when torque is introduced into the joint, the roller is subject to a tilting moment $T_R$ which tilts the roller inwardly around its face of contact with the loaded track.

FIGS. 2 and 5 each show a substantially annular inner joint part 31 with radially adjoining circumferentially distributed externally spherical arms 32. The inner joint part 31 is inserted into an outer joint part 33 with circumferentially distributed recesses 34. Roller assemblies are provided between the arms and recesses.

The roller assemblies include a roller carrier 36 with an internally cylindrical inner aperture. The carrier 36 is held radially movable on the arm 32 relative to the joint axis and pivotable relative to the arm axis. A wear insert 48 is provided at the boundary of the internally cylindrical inner surface of the roller carrier 36. A roller 38 is supported on the roller carrier 36 via a needle bearing 37. The needle bearing 37 and roller 38, with reference to the joint axis, are held on the roller carrier 36 via a radially inner collar 39 as well as via an externally positioned disc 40 and retaining ring 41.

Each of the halves of the recess 34, on opposite sides, have internally cylindrical tracks 42 and radially inner shoulders 44. The recess 34 has an externally positioned supporting face 45 which, when torque is introduced, may contact the roller carrier 36 on one side. The collar 39 of the roller carrier 36, on the half of the recess 34 which is subject to loads when torque is introduced, is contact-free at all angles of articulation. On the half of the recess 34 which is not subject to loads when torque is introduced, the roller carrier 36 is supported only in the region of the supporting face 45 on a diameter which is considerably smaller than that of the collar. This is achieved by a tilting moment $T_R$ acting on the roller and generated as a result of the torque introduced and as a result of a positive distance "a" between the force application line $K_1$, of a resulting force applied by the arm 32 to the roller carrier 36 and thus indirectly to the roller 38 (on the radial inside), and the force application line $K_2$, of a resulting force applied by the torque-loaded track 42 to the roller directly (on the radial outside).

The positive distance "a" between the two force application lines of the forces is to be maintained at all angles of articulation. This distance ensures that low friction forces are applied to the supporting face 45 on the roller carrier 36. Thus, no rotational movement occurs relative to the spherical arm 32, and as a result, any wear is avoided at the substantially linear contact face between the two.

Figure 6:
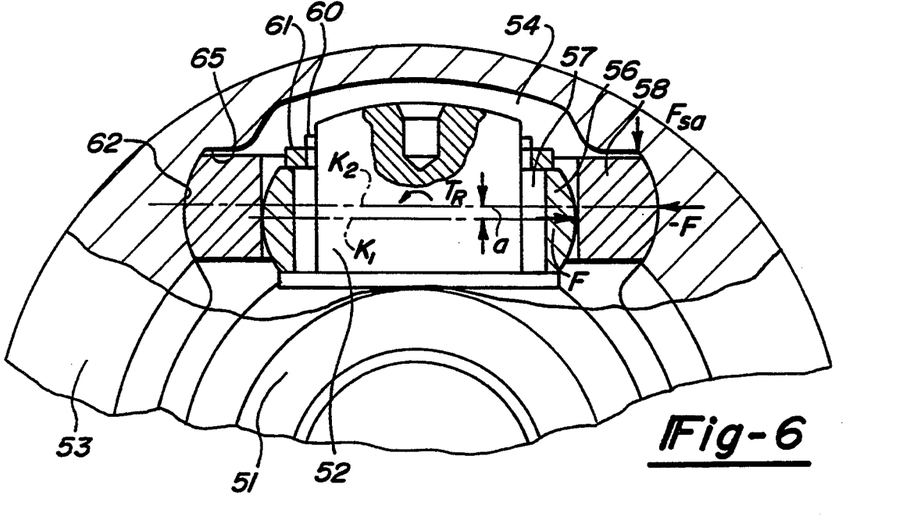
FIG. 6 is an enlarged detail view of FIG. 3.

FIGS. 3 and 6 each show a substantially annular inner joint part 51 with circumferentially distributed radial arms 52. An outer joint part 53, with circumferentially distributed recesses 54, engages the arms. Roller assemblies for torque transmitting purposes are provided between the arms and recesses.

The cylindrical arms 52, via needle bearing 57, rotatably support inner rollers 56 with spherical outer surfaces. On the inner rollers 56, rollers 58, with internally cylindrical inner surfaces, are radially movable with reference to the joint axis and pivotable with reference to the arm axis. The rollers 58 move in tracks 62 in both halves of the recess 54. The needle bearing 57 and the inner rollers 56 are axially secured to the arm via discs 60 and retaining rings 61.

The force application line $K_1$ of the resulting force applied by the inner joint part 51, indirectly via the inner roller 56 to the rollers 58, and the force application line $K_2$ of the resulting force applied by the outer joint part 53 to the roller 58, are shown in dash-dot lines. Line $K_1$ is located on the radial inside and line $K_2$ on the radial outside. Under all operating conditions, at all angles of articulation, a positive distance "a" is maintained between the two force application lines. Thus, when torque is introduced into the joint, a tilting moment $T_R$ occurs which acts on the roller and which is supported on the supporting faces 65 in the recess 45.

FIGS. 4 to 6 each show a joint subject to the forces which occur when torque is introduced. Assuming that the inner joint part is the driving part and the outer joint part the driven part, torque introduction into the joint would be clockwise. The forces occurring as a result on the right hand side of the roller assembly and acting from the arm on the roller assembly have been given the reference symbol -F. As a result of the distance between the two force application lines there occurs at the roller assembly, the tilting moment $T_R$ which is indicated by the curved arrow and which is to be primarily accommodated by supporting forces $F_{sa}$ on radially outer supporting faces.

Figure 7A:
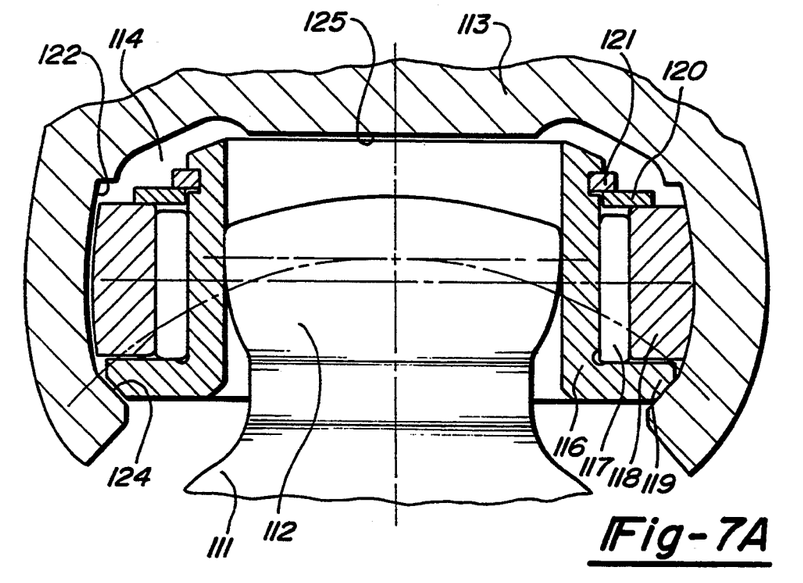
FIG. 7a is a view like FIGS. 4 through 6 of another embodiment at the moment of torque introduction.
Figure 7B:
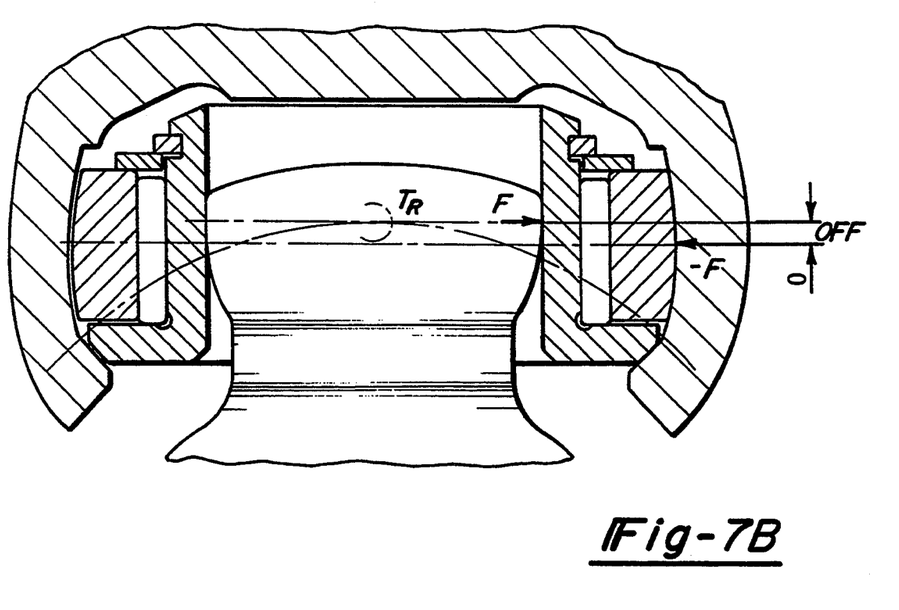
FIG. 7b is a view like FIG. 7a, with the forces acting on the roller.
Figure 7C:
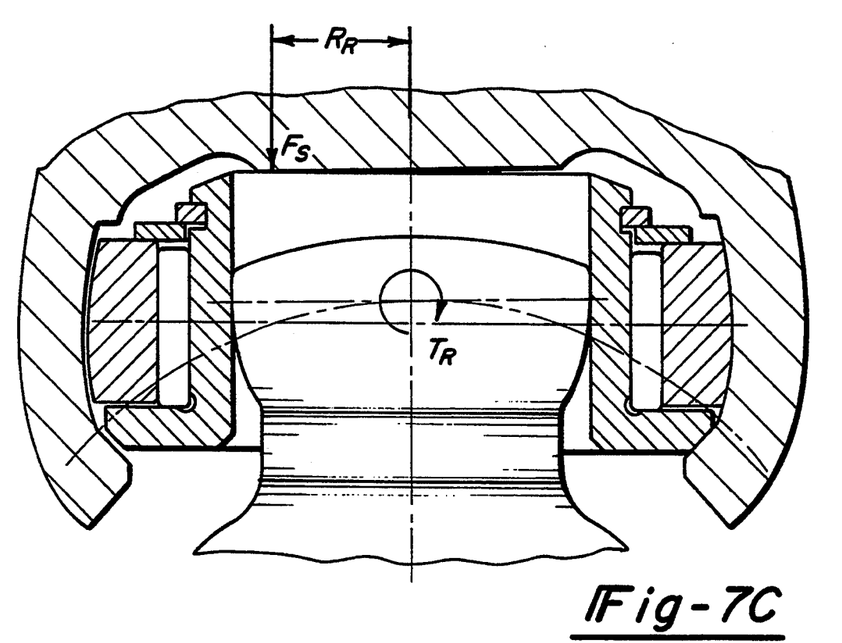
FIG. 7c is a view like FIG. 7a with the roller tilted under the effect of the forces shown in FIG. 7b.

FIGS. 7a to 7c each show only part of the inner joint part 11 with one of three radially adjoining, circumferentially distributed, externally spherical arms 112, inserted into an outer joint part 113. The outer joint part 113 is shown with one of three circumferentially distributed recesses 114. A roller assembly is provided between he arm and the recess. The roller assembly includes a roller carrier 116 with an internally cylindrical inner aperture. The carrier 116 is radially movably held on the arm 112 relative to the joint axis and pivotable relative to the arm axis. The roller carrier 116, via a needle bearing 117, supports a roller 118. The needle bearing 117 and roller 118, with reference to the joint axis, are held on the roller carrier 116 via a radially inner collar 119, an outer disc 120 and a retaining ring 121. The two halves of the recess 114, on opposite sides, each have internally cylindrical tracks 122 and radially inner shoulders 124. Furthermore, the recess 114 includes an outer supporting face 125.

FIG. 7a shows the joint at the moment when torque is introduced. Assuming that the inner joint part is the driving component and the outer joint part the driven component, torque introduction would be clockwise. The track 122 shown on the right is in contact with the roller.

FIG. 7b, while containing the same illustration as 7a, shows a tilting clockwise moment $T_R$ which acts on the roller as a result of a distance OFF between the force application line of a resulting force F, applied by the arm 112 to the roller carrier 16 and thus indirectly to the roller 118 (on the radial outside), and the force application line of a resulting force -F, applied by the torque-loaded right hand track 122 to the roller directly (on radial inside) with the line of force F being above the line of force -F.

FIG. 7c shows how, as a result of the tilting moment $T_R$ applied to the roller, the roller assumes a position tilted in the track around an axis which is parallel to the joint axis. In the process, the collar 119 is supported on the shoulder 124 on the loaded half of the recess 114, whereas the roller carrier 116, with its radially outer head face, is supported on the outer supporting face 125 of the track. A supporting moment acting against the tilting moment $T_R$ is generated through the supporting force $F_s$ by the lever arm $R_R$. The distance OFF between the two force application lines of the forces F and -F is to remain positive at all angles of articulation. Thus, the friction forces acting on the supporting face 125 on the roller carrier 116 are low. Therefore, no rotational movement occurs relative to the spherical arm 112. Thus, any wear between the two is avoided at the substantially linear contact face.

Figure 8A:
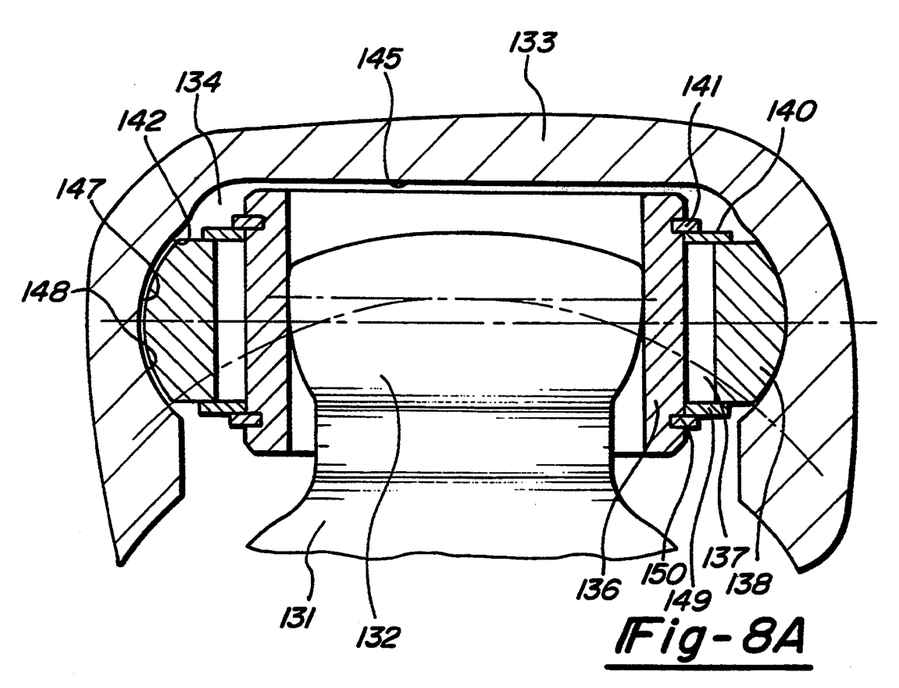
FIG. 8a is a view like FIGS. 4 through 6 of another embodiment at the moment of torque introduction.
Figure 8B:
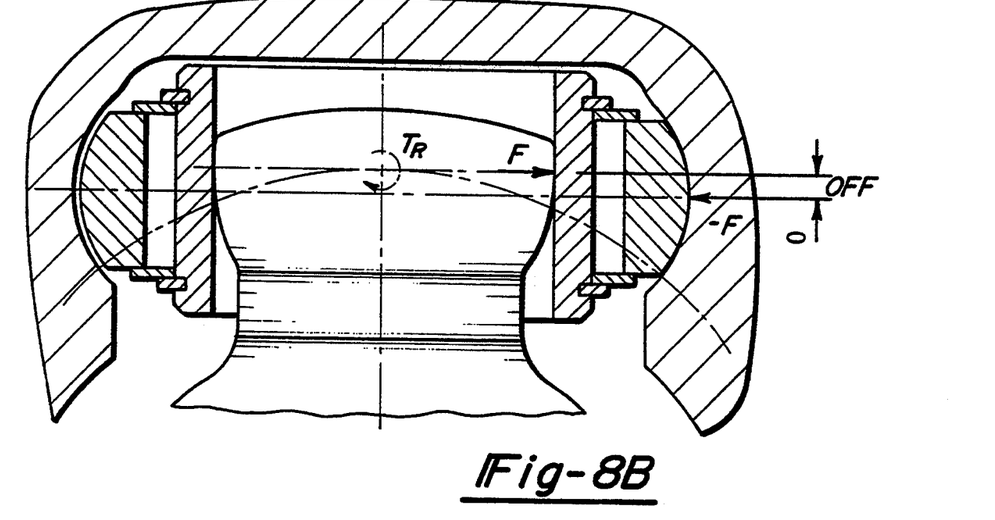
FIG. 8b is a view like FIG. 8a, with the forces acting on the roller.
Figure 8C:
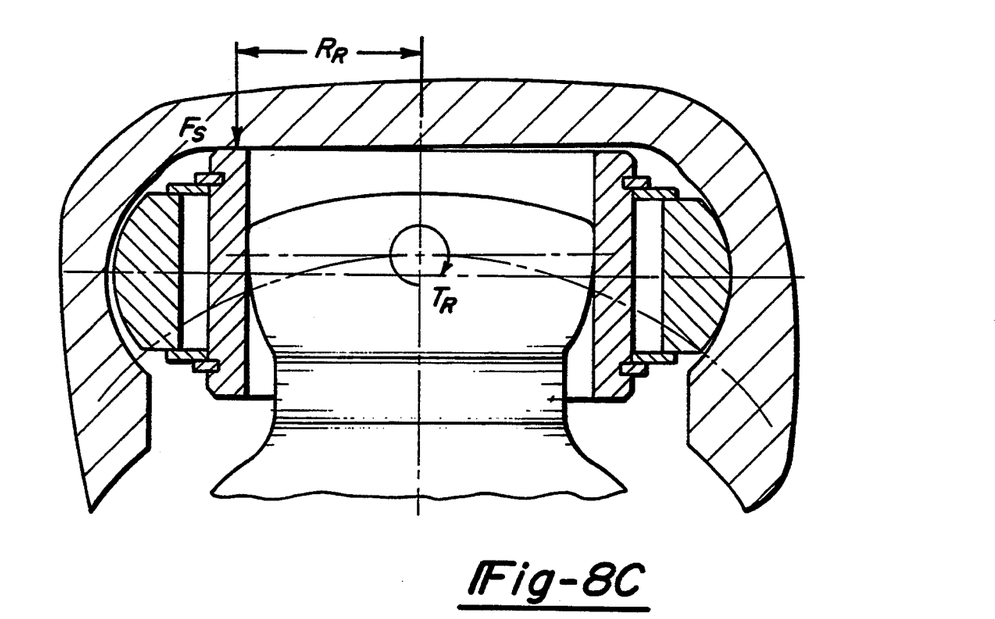
FIG. 8c is a view like FIG. 8a with the roller tilted under the effect of the forces shown in FIG. 8b.

In FIGS. 8a to 8c, any parts corresponding to FIGS. 7a to 7c have been given reference numbers increased by 20. In contrast to the joint illustrated in FIGS. 7a to 7c, the tracks 142 each include two cylindrical portions 147, 148 whose central axes are offset relative to one another and whose cross-section has the shape of a so-called Gothic arch. In the section shown, the radius of curvature of the two arch parts is greater than the radius of curvature of the roller 138. This joint differs further in that the roller 138 is secured to the roller carrier 136 both on the radial outside by the disc and securing ring 140, 141 and on the radial inside by the disc and securing ring 149, 150. The design of the track ensures that, independently of the application point of the force F-, the application point of the force -F changes only slightly.

Figure 9A:
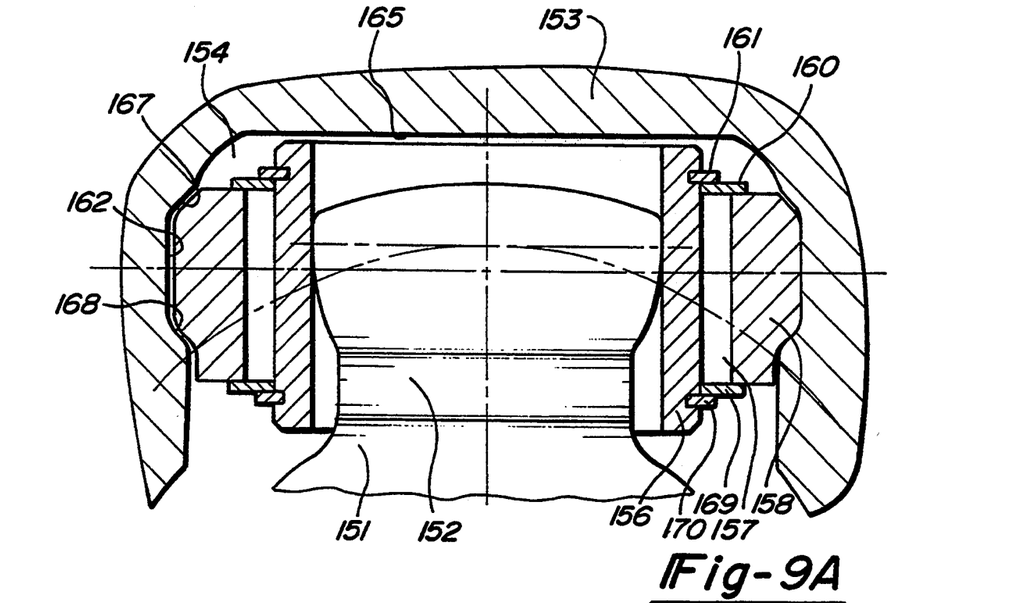
FIG. 9a is a view like FIGS. 4 through 6 of another embodiment at the moment of torque introduction.
Figure 9B:
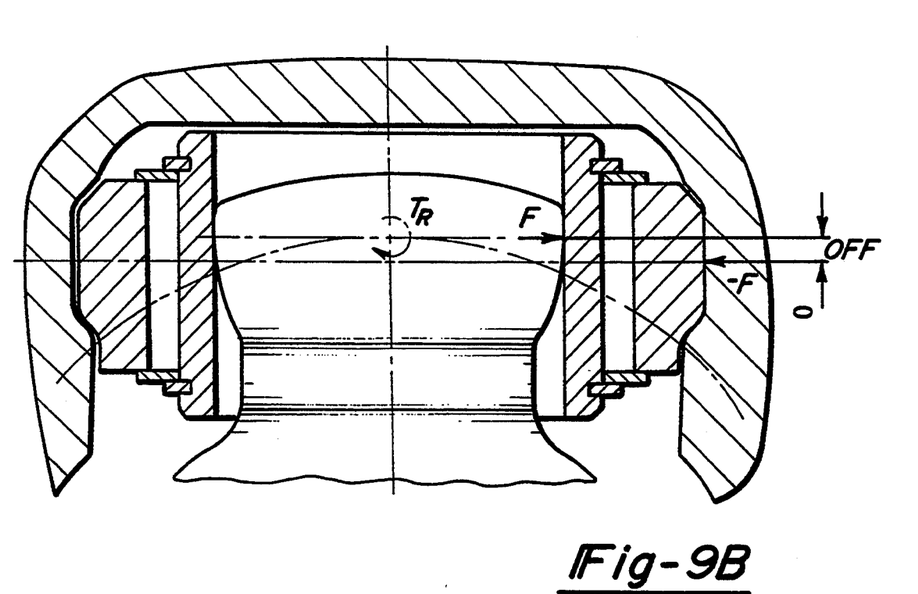
FIG. 9b is a view like FIG. 9a, with the forces acting on the roller.
Figure 9C:
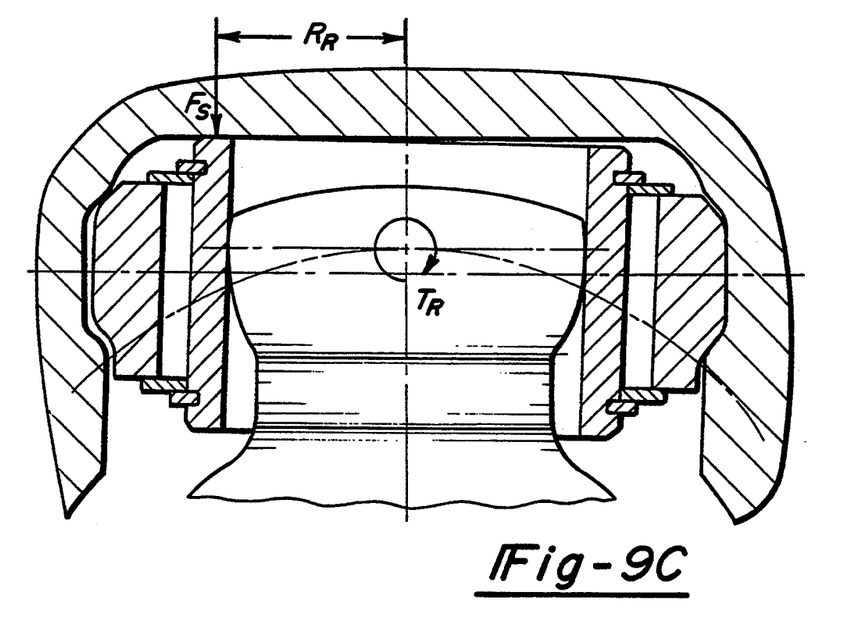
FIG. 9c is a view like FIG. 9a with a roller tilted under the effect of the forces shown in FIG. 9b.

In FIGS. 9a to 9c, again, any components corresponding to FIGS. 8a to 8c have been given reference numbers increased by 20. In contrast to the previous figures, reference has to be made to the shape of the tracks 162 and the roller 158. The cross-section of the track 162 is convex in its central region and forms two shoulders 167, 168. The roller 158, in its central region, is externally cylindrical and is provided with counter-shoulders which stop against the shoulders 167, 168 of the tracks 162. This track shape ensures that with a radially changing force F, the counter force -F substantially retains the same application point.

Figure 10:
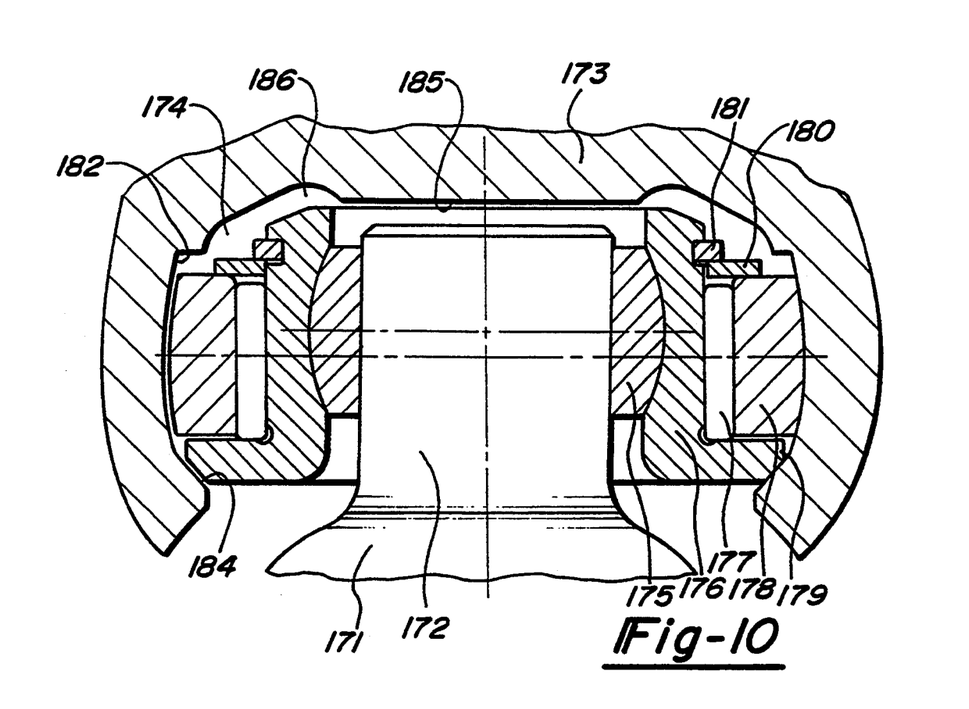
FIG. 10 is a view like FIGS. 4 through 6 of another embodiment of the invention.

FIG. 10 shows only part of a section through an inner joint part 171 with one of three circumferentially distributed, radial, cylindrical arms 172 and an outer joint part 173 with one of three circumferentially distributed recesses 174. The arm engages the recess and a roller assembly is arranged on the arm.

The roller assembly includes an inner ring 175 with an internally cylindrical inner surface and an externally spherical outer surface. The inner ring 175 may radially oscillate on the arm 172 with reference to the joint axis. The inner ring 175 holds a roller carrier 176 which, via an internally spherical recess, is pivotably positioned on the externally spherical outer surface of the inner ring 175. A roller 178 is rotatably held on the roller carrier 176 via needle bearing 177. The needle bearing and roller, with reference to the joint axis, are held by a radially inner collar 179, a radially outer disc 180 and a securing ring 181.

When torque is introduced, the externally spherical roller 178 rolls on one of the tracks 182 in the recess 174. On the radial inside of the roller assembly, the recess 174, on both halves, includes shoulders 184, with the shoulder positioned on the recess half not subjected to loads remaining contact-free when torque is introduced. The roller carrier 179, on the other hand, on the half of the recess 174 not subjected to loads, when torque is introduced, may support itself with its head face on a supporting face 185 on the radial outside of the roller assembly. On each half of the recess, the supporting face 185, by radial extensions 186, is restricted to a region close to the arm axis.

Two dash-dot lines indicate the force application line of a resulting force acting from the arm to the inner ring 175, and thus indirectly to the roller 178 (on the radial outside), and the force application line of a resulting force acting from the tracks 182 directly on the roller 178 (on the radial inside). The lines maintain a positive radial distance from one another at all operating angles of articulation. As a result, a tilting moment is applied to the roller clockwise and outwardly around the right hand track if it is assumed that the track is loaded when torque is introduced.

Figure 11:
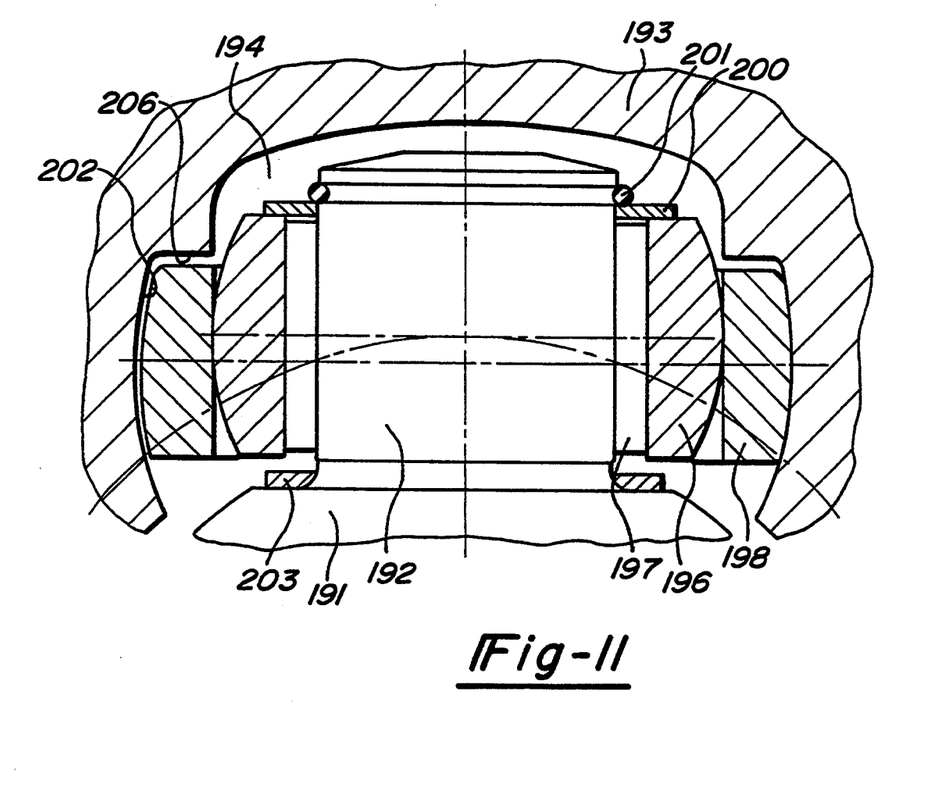
FIG. 11 is a view like FIG. 10 of another embodiment of the present invention.

FIG. 11 shows only part of an inner joint part 191 with one of three circumferentially distributed radial arms 192 and an outer joint part 193 with one of three circumferentially distributed recesses 194 engaged by the arm. A roller assembly, for torque transmitting purposes, is provided between the arm and recess.

The cylindrical arm 192 rotatably supports an inner roller 196 via a needle bearing 197. The roller 196 has a spherical outer surface and supports a roller 198. The roller 198 has an internally cylindrical inner surface radially movable with reference to the joint axis and pivotable with reference to the arm axis. The roller 198 moves in track 202 in both halves of the recess 194. The needle bearing 197 and the inner roller 196 are axially secured to the arm via a disc 100 and a securing ring 101 and a stop ring 103.

The force application line of the resulting force indirectly applied by the inner joint part 191, via the inner roller 196, to the roller 198 and the force application line of the resulting force applied by the outer joint part 193 to the roller 198 are indicated by dash-dot lines. The former line is located on the radial outside and the latter line on the radial inside. Under all operating conditions, at all angles of articulation, a positive distance is maintained between the two force application lines. Thus, assuming the track is loaded when torque is introduced, a tilting moment is applied to the roller clockwise and outwardly around the right hand track. When the roller 198 is tilted as a result, it is supported on supporting faces 206 in the recess 194.

While the above detailed description describes the preferred embodiment of the present invention, the invention is susceptible to modification, variation, and alteration without deviating from the scope and fair meaning of the subjoined claims.

We claim:

1. A tripod joint comprising an outer joint part with three circumferentially distributed, axis-parallel recesses forming circumferentially opposed tracks;

an inner joint part having a star-shaped cross-section and three circumferentially distributed arms engaging the recesses in the outer joint part, said inner and outer joint parts defining a joint axis;

roller assemblies supported on said arms, each including a roller carrier assembly and a roller, with at least the roller, relative to the respective arm, arranged axially movable relative to the arm axis and angularly movably pivotable relative to the arm axis;

spherical faces at the arms or at the roller carrying assembly of the respective roller assembly and internally spherical or internally cylindrical counter faces of the roller carrier assembly or the rollers, on the one hand, and the outer surfaces of the rollers and the track surfaces in contact therewith, on the other hand, when torque is transmitted with the joint being in a non-articulated position, a first resultant of the forces acting from the inner joint part directly on the roller between the arm faces or roller assembly faces at a shorter perpendicular distance from the joint axis than a second resultant of the counter forces acting at the outer joint part on the roller between the internally spherical or internally cylindrical counter faces of the roller carrier assembly so that the first resultant is offset from the second resultant, and so that, when torque is introduced into the joint, at any angle of articulation in the operating range, the roller is subject to a tilting moment which tilts the roller inwardly towards the joint axis around the contact faced at the loaded track.

2. A tripod joint according to claim 1, wherein one or more supporting faces are in the recess and on one of the elements of the roller assembly, so that on the half of the recess which is subjected to loads when torque is introduced, the roller assembly displaced by the tilting moment is supported on said supporting faces which, with reference to the joint axis, are located on the radial outside of the roller assembly, whereas on the half of the recess which is not subjected to loads when torque is introduced, said roller assembly is supported on faces which, with reference to the joint axis, are located on the radial inside of the roller assembly.

3. A tripod joint according to claim 1, wherein when the roller assembly is not displaced, a free radial space is between the elements of the roller assembly and the recess supporting faces.

4. A tripod joint according to claim 2, wherein the supporting faces and counter faces are formed by the tracks in the recesses, which, in cross-section through the joint, deviate from the cross-sectional shape of the outer surfaces of the rollers.

5. A tripod joint according to claim 1, wherein said arm is cylindrical and an inner ring with an internally cylindrical surface is axially movable relative to the arm axis, said inner ring including a spherical outer surface engaging an at least part-spherical inner surface of the roller carrier assembly which is pivotably held on the inner ring relative to the arm axis and the roller is rotatably held on the roller carrier assembly.

6. A tripod joint according to claim 5, wherein a needle bearing is provided between the roller carrier assembly and the roller.

7. A tripod joint according to claim 1, wherein the arm has a part-spherical head roller carrier assembly with a cylindrical inner aperture so as to be axially movable relative to the arm axis and pivotable relative to the arm axis and that a roller is rotatably held on the roller carrier assembly.

8. A Tripod joint according to claim 7, wherein a needle bearing is arranged between the roller carrier assembly and the roller.

9. A tripod joint according claim 1, wherein said arm is cylindrical, an internally cylindrical inner ring with an externally spherical surface is rotatably positioned on said arm, a roller with an internally cylindrical inner surface is on the inner ring and is axially displaceable relative to the arm axis and pivotable relative to the arm axis.

10. A tripod joint according to claim 9, wherein a needle bearing is arranged between the arm and the inner ring.

11. A tripod joint comprising:

an outer joint part with three circumferentially distributed, axis-parallel recesses forming circumferentially opposed tracks;

an inner joint part having a star-shaped cross-section and three circumferentially distributed arms engaging the recesses in the outer joint part, said inner and outer joint parts defining a joint axis;

roller assemblies supported on said arms, each roller assembly including a roller carrier assembly and a roller, with at least said roller relative to the respective arm, being axially movable relative to the arm axis and angularly movably pivotable relative to the arm axis;

spherical faces at the arms or at the roller carrying assembly of the respective roller assembly and internally spherical or internally cylindrical counter faces at the roller carrier assembly of the roller assembly or at the rollers, on the one hand, and the outer surfaces of the rollers and the track surfaces in contact therewith, on the other hand, when torque is transmitted with the joint being in a non-articulated position, a first resultant of the forces acting from the inner joint part directly on the roller between the spherical arm or roller carrier assembly faces at a greater perpendicular distance from the joint axis than a second resultant of the counter forces acting at the outer joint part on the roller between the internally spherical or internally cylindrical faces so that the first resultant is offset from the second resultant, at any angle of articulation in the operating range, the roller is subject to a tilting moment which tilts the roller outwardly around its region of contact at the loaded track.

12. A tripod joint according to claim 11, wherein, with reference to the joint axis, one or more supporting faces are in the recess and on one of the elements of the roller assembly, so that on the recess half subjected to loads, when torque is introduced, the roller displaced by the tilting moment is supported radially inwardly on the roller assembly on first outer joint part supporting faces, and on the recess half not subjected to loads when torque is introduced, said roller is supported radially outwardly on the roller assembly on second outer joint part supporting faces.

13. A tripod joint according to claim 12, wherein, with reference to the joint axis, a free radial space is between the elements of the roller assembly and the supporting faces of the recess so that when the roller is tilted under the influence of the tilting moment, it is possible, on the radial outside of the roller assembly, to exclude contact between the roller assembly and the recess half subjected to loads when torque is introduced and on the radial inside of the roller assembly between the roller assembly and the recess half not subjected to loads when torque is introduced.

14. A tripod joint according to claim 11, wherein, with reference to the arm axis, the supporting faces of the roller assembly which, under the influence of the tilting moment, contact with the respective recess have a smaller diameter than the surfaces of the roller in the region of contact with the track.

15. A tripod joint according to claim 11 wherein the arms include a part-spherical head, the roller carrier assembly having a cylindrical inner aperture enabling axially movement relative to the arm axis and pivotable relative to the arm axis and the roller being rotatably held on the roller carrier assembly.

16. A tripod joint according to claim 15, wherein a needle bearing is arranged between the roller carrier assembly and the roller.

17. A tripod joint according to claim 11, wherein the arms are cylindrical, an inner ring with an internally cylindrical surface begin axially movable relative to the arm axis, said inner ring including a spherical outer surface engaging an at least part-spherical inner surface of the roller carrier assembly which is held on the inner ring so as to be pivotable relative to the arm axis and that a roller is rotatably held on the roller carrier assembly.

18. A tripod joint according to claim 17, wherein a needle bearing is provided between the roller carrier assembly and the roller.

19. A tripod joint according to claim 11, wherein said arm is cylindrical and rotatably holds an internally cylindrical inner ring with an externally spherical surface, the roller having an internally cylindrical surface being guided on the inner ring so as to be axially displaceable relative to the arm axis and pivotable relative to the arm axis.

20. A tripod joint according to claim 19, wherein a needle bearing is arranged between the arm and the inner ring.

* * * * *